June 13, 1961 C. E. MALMQUIST ET AL 2,988,108
MULTI-WAY VALVE

Filed July 31, 1958 2 Sheets-Sheet 1

2,988,108
MULTI-WAY VALVE

Carl E. Malmquist, Garden Grove, and William W. Chambers, Anaheim, Calif., assignors to Robertshaw-Fulton Controls Company, Richmond, Va., a corporation of Delaware
Filed July 31, 1958, Ser. No. 752,227
4 Claims. (Cl. 137—625.46)

This invention relates to valves, and more particularly to valves having disc-type valve members.

In general, such valve members are relatively flat and are rotatable between positions for controlling fluid flow through the valve. When used in pressurized systems, force unbalances caused by unequal pressure distributions acting upon the disc valve members tend to cause such valve members to cock whereupon fluid may leak between the valve seats and the valve members. Furthermore, the forces created by pressures acting against the bottom of the disc members tend to increase the frictional force between the valve casings and valve members which, if great enough, will hinder the operation and movement of the valve members.

Accordingly, it is an object of this invention to prevent leakage between the disc valve members and their respective valve seats.

Another object of this invention is to eliminate cocking of the disc valve members.

A further object of this invention is to minimize the frictional forces between the disc valve members and the valve casings caused by pressurized fluid acting against the bottom of the members.

Briefly stated, in a preferred embodiment of this invention, a valve casing is provided having at least one inlet and at least one outlet. A disc valve member comprising two discs separated by an annular spacing member is movable between positions for controlling the flow of fluid between the inlet and the outlet. To eliminate cocking, an axial pin is provided which extends between the discs and the valve casing. Movable valve seat members are disposed within the inlet and the outlet and are biased into engagement with one of the discs.

Further objects and advantages of this invention will be apparent from the following description taken in connection with the accompanying drawings wherein.

Figure 1:
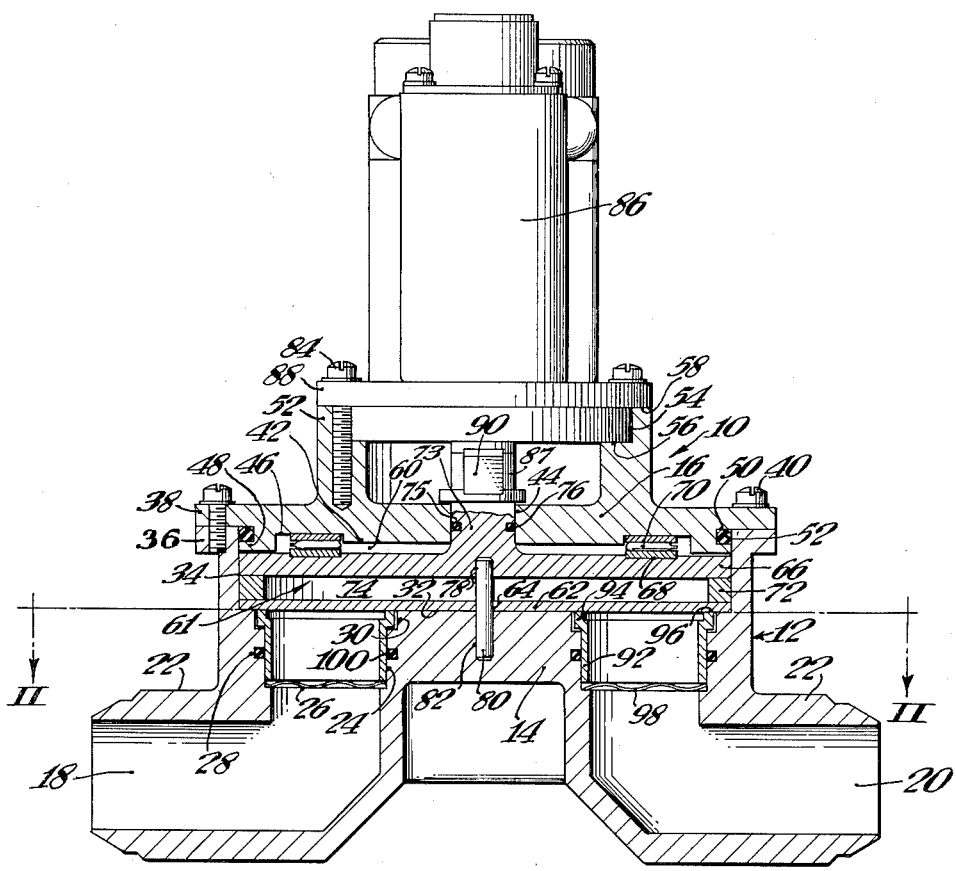
FIG. 1 is an elevation, partly in section, of an embodiment of this invention.

Referring more particularly to the drawings, in FIG. 1 a valve 10 is shown provided with a casing 12 having a lower casing member 14 and an upper casing member 16. Lower casing member 14 is formed with angular passages 18, 19, and 20 therein through which fluid may flow in a manner described hereinafter. Each of the passages is provided at one end with a tubular extension 22 which is adapted to receive a connector by which valve 10 may be connected into a fluid system. At the other end, each of the passages is formed with a counterbore 24 having a shoulder 26 and an annular groove 28 formed therein. A second counterbore 30 is formed where the passage intersects and extends through a bottom wall 32 defined by an enlarged recess 34 in casing member 14. A cylindrical side wall of recess 34 extends upwardly and terminates in an annular flange 36.

Upper casing member 16 is formed with an annular flange 38 which is connected to flange 36 by a plurality of screws 40. A recess 42 is formed in casing member 16 and has an axial aperture 44 extending therethrough. An annular depression 46 formed in the bottom wall of recess 42 terminates at its outer periphery in an annular projection 48 which is positioned within side wall 34 of casing member 14 and forms a positive locating element. An annular groove 50 is formed in projection 48 and has an O-ring seal 52 positioned therein to prevent fluid from leaking from the interior of casing 12. A collar 52 is formed integral with upper casing member 16 and extends in an axial direction. The upper edge 58 of collar 52 is provided with a counterbore 54 having a lower shoulder 56 which serves as a support for motor 86.

It will readily be apparent that recesses 34 and 42 of casing members 14 and 16 respectively together form a chamber 60 therebetween which communicates with each of the passages 18, 19, and 20. For controlling a flow of fluid through the passages, valve means 61 are provided which comprise a lower disc member 62 formed with a central aperture 64 therein. A series of apertures (not shown) are formed in disc 62 of approximately the same diameter as that of the passages and are spaced a radial distance equal to that of the passages. The bottom of disc 62 is machined and is adapted to lie against wall 32 of casing 12 in a fluid-tight relation. An upper disc member 66 has an annular depression 68 on the top surface thereof adapted to receive and position a needle bearing means 70 which extends between disc 66 and depression 46 in upper casing member 16. An axial shaft 73 extends from disc 66 through opening 44 of casing member 16 and is formed with an annular groove 75 therein in which an O-ring seal 76 is positioned to prevent leakage between shaft 73 and casing member 16. An annular spacer member 72 is positioned between disc 66 and disc 62 and has an inner wall diameter sufficient to encompass the apertures in disc 62 and to form a flow passage 74 of predetermined capacity in the chamber 60.

An axial pin 80 is provided to prevent cocking of valve means 61 and is positioned within an axial recess 78 formed in disc 66, in aperture 64 formed in disc 62, and in hole 82 formed in lower casing member 14. Pin 80 may be press-fitted into the respective discs and guided by the hole 82 in the lower casing member 14 or, alternatively, it may be press-fitted into hole 82 and guided by discs 62 and 66.

Actuating means for moving valve means 61 are provided and comprise a motor 86 having a rotatable shaft 87 extending therefrom and connected to shaft 73 by connector 90. Motor 86 is formed with a support flange 88 which is positioned within casing member 16 and connected thereto by a plurality of screws 84. Rotation of motor 86 in either direction causes disc 62, disc 66, and spacer 72 to move as a unit.

Positioned within each of the counterbores 24 in passages 18, 19, and 20, are a plurality of valve seats 92 which are substantially tubular and are provided at one end with a collar 94 which has a machined valve seat surface 96 formed thereon adapted to engage the bottom of disc 62 in a fluid-tight seal. An annular sinuous spring 98 biases valve member 92 against disc 66. An O-ring seal 100 is positioned in recess 28 to prevent fluid within the passage from leaking behind valve seat member 92. The amplitude of spring 98 should be such that when in an unbiased position, it causes the valve seat member 92 to be positioned with the seat surface 96 thereof slightly above the level of surface 32 of casing member 14 so that when disc 62 is positioned within casing 12, it will cause valve seat member 92 to be depressed into its passage and thereby compress spring 98. Because the bottom surface of disc 62 and the seat 96 are machined, the bias of spring 98 will cause the fluid-tight seal to be formed between the members.

The thickness of spacer 72 will determine the pressure drop caused by fluid passing through flow passage 74 between disc 66 and disc 62. If a different pressure drop is desired, it is necessary to change the thickness of spacer 72 and to change the dimensions of cooperating parts accordingly.

Figure 3:
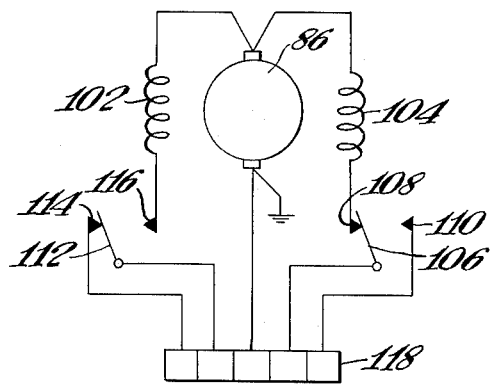
FIG. 3 is a schematic view of an actuating means partly shown in FIG. 1.

In the embodiment as shown substantially in FIG. 3, motor 86 is a series wound D.C. motor having field coils 102 and 104. The energization of coil 104 is controlled by a switch member 106 movable between contacts 108 and 110 and the energization of coil 102 is controlled by a switch member 112 movable between contacts 114 and 116. The wires connected between the switch members and the power source, and the motor and the power source, extend through a terminal board 118. If, for example, switch 106 closes with contact 108, power will flow through the motor 86 and coil 104 causing the motor and shaft to rotate the disc valve means through a limited angular movement. At the same time, switch member 112 being closed with contact 114 will close a circuit which may be used to energize an indicator (not shown) which would indicate the position of the valve member.

It will be apparent that the invention thus far disclosed has many uses and applications. By way of example only and for purposes of illustration, the valve 10 could be connected into a fluid system such that passage 19 becomes an inlet passage and passages 18 and 20 are outlets. By providing disc 62 with two openings therein spaced 90° apart, such that when the disc is in one position, one of these holes is in alignment with passage 19 and the other is in alignment with passage 18, and when in the other position such that one of the apertures is in alignment with inlet passage 19 and the other is in alignment with outlet passage 20, the operation is as follows: with field coil 104 energized, the motor 86 rotates disc 62 to a position where the apertures in disc 62 are in alignment with inlet passage 19 and outlet passage 20. The fluid will flow from inlet 19 through the first aperture into flow passage 74 and out through the other aperture into outlet 20. By opening switch member 106 and closing switch member 112 with contact 116, coil 104 is de-energized and coil 102 is energized whereupon the motor will rotate through an angle of 90° whereupon the apertures will be in alignment with inlet passage 19 and outlet passage 18. Fluid will then flow from inlet 19 to outlet 18.

Figure 2:
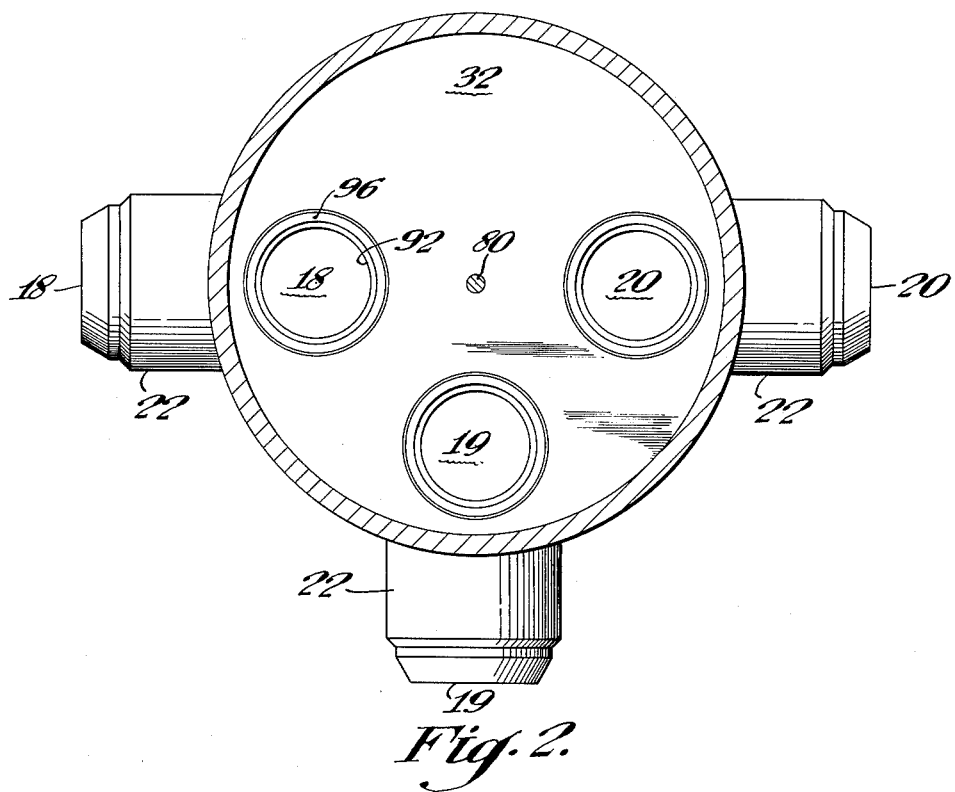
FIG. 2 is a section along line II—II of FIG. 1.

Applicants do not wish to be limited to the particular arrangement and number of passages shown in FIG. 2. By way of further example, the valve 10 can be formed such that it has only an inlet passage and an outlet passage. By providing disc 62 with apertures diametrically opposed to one another and by using a two-position motor, applicant provides an on-off flow control valve wherein in one position, the apertures are not in alignment with the inlet and outlet passages. When the actuating means causes the discs to rotate, the inlet passage is connected to the outlet passage and fluid may flow through the chamber or through the valve casing 12.

By using multiposition actuators, as opposed to the two-position actuator illustrated, and by using other passage locations and numbers, various arrangements of fluid flow and control thereof may be obtained. It is understood that many changes may be made in the combination and arrangement of parts and in the details of construction within the scope of the appended claims without departing from the invention disclosed herein.

We claim:

1. In a valve, the combination of a casing having an inlet and an outlet for fluid communicating with a cylindrical walled chamber, and valve means mounted for rotation in said chamber for controlling communication between said inlet and outlet, said valve means including a pair of independent disc valve members having peripheral edges cooperable with the wall of said chamber, said valve members having opposite faces uniformly separated by an annular spacer member positioned therebetween, one of said valve members being seated in overlying relation to said inlet and outlet and having a plurality of apertures for registry therewith respectively, said spacer member having a predetermined height and an inner wall diameter sufficient to encompass said apertures leaving an unobstructed flow passage of predetermined capacity restrictive relative to at least one of said inlet or outlet and extending between said opposite faces from said inlet to said outlet.

2. The valve of claim 1 wherein valve seat members are movably disposed within said inlet and said outlet, said members being biased into slidable engagement with the one said disc valve member having apertures therein to prevent fluid from leaking into said chamber.

3. The valve of claim 1 in which a pivot pin extends axially through said disc valve members and cooperates with said casing to prevent cocking of said valve means.

4. The valve of claim 1 wherein bearing means are disposed within said chamber in engagement with said casing and the other one of said disc valve members to facilitate movement of said valve means.

References Cited in the file of this patent

UNITED STATES PATENTS

| 2,377,473 | Wolcott | June 5, 1945 |
| 2,519,574 | Holl | Aug. 22, 1950 |
| 2,696,219 | Barksdale | Dec. 2, 1954 |

FOREIGN PATENTS

| 329,059 | Great Britain | May 15, 1930 |